(12) United States Patent
Peuchert et al.

(10) Patent No.: US 7,727,916 B2
(45) Date of Patent: Jun. 1, 2010

(54) ALKALI-FREE ALUMINOBOROSILICATE GLASS, AND USES THEREOF

(75) Inventors: Ulrich Peuchert, Bodenheim (DE); Ludwig Gaschler, Mainz (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 11/713,747

(22) Filed: Mar. 5, 2007

(65) Prior Publication Data

US 2007/0265156 A1 Nov. 15, 2007

Related U.S. Application Data

(63) Continuation of application No. 10/472,528, filed as application No. PCT/EP02/02432 on Mar. 6, 2002, now abandoned.

(30) Foreign Application Priority Data

Mar. 24, 2001 (DE) ................ 101 14 581

(51) Int. Cl.
C03C 3/091 (2006.01)
C03C 3/093 (2006.01)

(52) U.S. Cl. .................. 501/66; 501/67

(58) Field of Classification Search ........... 501/66, 501/67
See application file for complete search history.

(56) References Cited

U.S. PATENT DOCUMENTS

| | | | |
|---|---|---|---|
| 4,366,409 A | 12/1982 | Nieda et al. | |
| 5,459,109 A | 10/1995 | Lapp | |
| 5,508,237 A | 4/1996 | Moffatt et al. | |
| 6,060,168 A | 5/2000 | Kohli | |
| 6,329,310 B1 | 12/2001 | Peuchert et al. | |
| 6,417,124 B1 | 7/2002 | Peuchert et al. | |
| 6,458,730 B1 * | 10/2002 | Nagata et al. | 501/9 |
| 6,465,381 B1 | 10/2002 | Lautenschläger et al. | |
| 6,468,933 B1 * | 10/2002 | Narita et al. | 501/56 |
| 6,537,937 B1 * | 3/2003 | Nishizawa et al. | 501/66 |
| 6,867,158 B2 | 3/2005 | Peuchert et al. | |
| 6,992,031 B2 | 1/2006 | Naumann et al. | |
| 7,137,278 B2 * | 11/2006 | Ott et al. | 65/134.3 |
| 7,153,797 B2 * | 12/2006 | Peuchert | 501/66 |
| 7,157,392 B2 * | 1/2007 | Peuchert et al. | 501/66 |

FOREIGN PATENT DOCUMENTS

| | | | |
|---|---|---|---|
| DE | 10000837 | | 5/2001 |
| EP | 0559389 | | 9/1993 |
| EP | 0672629 | | 9/1995 |
| EP | 1070681 | | 1/2001 |
| EP | 1078893 | | 2/2001 |
| JP | 55-155464 | | 12/1980 |
| JP | 63-050345 | | 3/1988 |
| JP | 6350345 | * | 3/1988 |
| JP | 64-028249 | | 1/1989 |
| JP | 08-091874 | | 4/1996 |
| JP | 08091874 | * | 4/1996 |
| JP | 08-231240 | | 9/1996 |
| JP | 08231240 | * | 9/1996 |
| JP | 11-322358 | * | 11/1999 |
| JP | 11322358 | | 11/1999 |
| JP | 2000-159541 | | 6/2000 |
| JP | 2001-026455 | | 1/2001 |
| JP | 2001-048573 | | 2/2001 |
| JP | 2001151534 | * | 5/2001 |
| JP | 2001151534 | | 6/2001 |
| JP | 2002-029775 | | 1/2002 |
| WO | WO 01/00538 A2 | | 1/2001 |

OTHER PUBLICATIONS

Delphion Record—Japanese Abstract of JP-2001151534, printed Aug. 31, 2007.
Delphion Record—Japanese Abstract of JP-11322358, printed Aug. 31, 2007.
Abstract (Delphion) Published Aug. 31, 1981.

* cited by examiner

*Primary Examiner*—Karl E Group
(74) *Attorney, Agent, or Firm*—Millen, White, Zelano, Branigan, P.C.

(57) ABSTRACT

The invention relates to an aluminoborosilicate glass devoid of alkali, which has the following composition (in wt. % relative to the oxide content): $SiO_2$ >58-70; $B_2O_3$ 0.5-<9; $Al_2O_3$ 10-25; MgO>8-15; CaO 0-<10; SrO 0-<3; BaO 0-<2; with MgO+CaO+SrO+BaO>8-18; ZnO 0-<2. Said glass is eminently suitable for use as substrate glass, both in display technology and in thin-film photovoltaic technology.

14 Claims, No Drawings

ALKALI-FREE ALUMINOBOROSILICATE GLASS, AND USES THEREOF

This application is a continuation of U.S. application Ser. No. 10/472,528, filed Sep. 24, 2003 (abandoned), which is a 371 National stage application of PCT/EP02/02432, filed Mar. 6, 2002.

The invention relates to an alkali-free aluminoborosilicate glass. The invention also relates to uses of this glass.

High requirements are placed on glasses for applications as substrates in flat-panel liquid-crystal display technology, for example in TN (twisted nematic)/STN (supertwisted nematic) displays, active matrix liquid-crystal displays (AMLCDs), thin-film transistors (TFTs) or plasma-addressed liquid crystals (PALCs). Besides high thermal shock resistance and good resistance to the aggressive chemicals employed in the process for the production of flat-panel screens, the glasses should have high transparency over a broad spectral range (VIS, UV) and, in order to save weight, a low density. Use as substrate material for integrated semiconductor circuits, for example in TFT displays ("chip on glass") in addition requires thermal matching to the thin-film material silicon which is usually deposited on the glass substrate in the form of amorphous silicon (a-Si) at low temperatures of up to 300° C. The amorphous silicon is partially recrystallized by subsequent heat treatment at temperatures of about 600° C. Owing to the a-Si fractions, the resulting, partially crystalline poly-Si layer is characterized by a thermal expansion coefficient of $\alpha_{20/300} \cong 3.7 \times 10^{-6}$/K. Depending on the a-Si/poly-Si ratio, the thermal expansion coefficient $\alpha_{20/300}$ may vary between $2.9 \cdot 10^{-6}$/K and $4.2 \cdot 10^{-6}$/K. When substantially crystalline Si layers are generated by high temperature treatments above 700° C. or direct deposition by CVD processes, which is likewise desired in thin-film photovoltaics, a substrate is required which has a significantly reduced thermal expansion of $3.2 \times 10^{-6}$/K or less. In addition, applications in display and photovoltaics technology require the absence of alkali metal ions. Sodium oxide levels of less than 1500 ppm as a result of production can be tolerated in view of the generally "poisoning" action due to diffusion of $Na^+$ into the semiconductor layer.

It should be possible to produce suitable glasses economically on a large industrial scale in adequate quality (no bubbles, knots, inclusions), for example in a float plant or by drawing methods. In particular, the production of thin (<1 mm) streak-free substrates with low surface undulation by drawing methods requires high devitrification stability of the glasses. In order to counter compaction of the substrate during production, in particular in the case of TFT displays, which has a disadvantageous effect on the semiconductor microstructure, the glass needs to have a suitable temperature-dependent viscosity characteristic line: with respect to thermal process and shape stability, it should have a sufficiently high glass transition temperature, i.e. $T_g$>700° C., while on the other hand not having excessively high melting and processing ($V_A$) temperatures, i.e. a $V_A$ of $\leq$1350° C.

The requirements placed on glass substrates for LCD display technology or thin-film photovoltaics technology are also described in "Glass substrates for AMLCD applications: properties and implications" by J. C. Lapp, SPIE Proceedings, Vol. 3014, invited paper (1997), and in "Photovoltaik—Strom aus der Sonne" by J. Schmid, Verlag C. F. Müller, Heidelberg 1994, respectively.

From the production point of view, the transition to larger display formats places new requirements on the mechanical stability and the specific gravity of the glass substrates. The transition from present-day 600 mm×720 mm sheets to sheets having dimensions of e.g. 1 m×1 m and more would lead to a corresponding increase in weight which would have an effect on, inter alia, the robot handling for transporting the glass sheet from one production process step to another. To minimize "elastic sagging", i.e. sagging of the sheets under their own weight, a glass is desirable which has a high modulus of elasticity of >80 GPa, preferably $\geq$85 GPa, combined with a low density of <2.55 g/cm$^3$. This also minimizes the risk of sagging of the sheet during coating of the glass substrate with an active silicon layer.

The glasses described in "Mechanical Properties of AMLCD Glass Substrates", Proceedings of the XVIII International Congress on Glass, San Francisco, Calif., USA, Jul. 5-10, 1998, have distinct disadvantages in this respect.

The same applies to the display or solar cell substrate glasses described in the following documents.

They do not meet the full list of requirements for the abovementioned applications.

Numerous documents describe glasses which are free of MgO or low in MgO and therefore do not have the required high mechanical stability, for example WO 97/11919, WO 97/11920, U.S. Pat. No. 5,374,595, WO 00/32528, JP 9-156953A, JP 10-72237A, EP 714 862 B, EP 341 313 B, DE 196 03 698 C1, DE 196 17 344 C1, DE 42 13 579 A and WO 98/27019.

Some of these glasses and also the glasses of DE 197 36 912 C1 and, according to the examples, the glasses of JP 9-48 632 A contain relatively high amounts of the heavy alkaline earth metal oxides BaO and/or SrO which leads to poor meltability. Moreover, such glasses have an undesirably high density, which is disadvantageous in particular for large-format displays.

Glasses having high boric acid contents, as described in JP 8-295530 A, are easy to melt owing to their low melting temperatures, but have insufficient heat resistance and chemical resistance, in particular to hydrochloric acid solutions. Moreover, they have rather low moduli of elasticity.

DE 196 01 022 A1 describes SnO-containing glasses which are selected from a very wide composition range. The glasses, which, according to the examples, are low in MgO, rich in $B_2O_3$ and rich in BaO, tend to exhibit glass defects because of the $ZrO_2$ level which has to be present.

In the unexamined Japanese publications JP 10-25132 A, JP 10-114538 A, JP 10-130034 A, JP 10-59741 A, JP 10-324526 A, JP 11-43350 A, JP 11-49520 A, JP 10-231139 A, JP 10-139467 A, JP 11-292563 A and JP 2000-159541 A, mention is made of very wide composition ranges for display glasses, which can be varied by means of many optional components and which are admixed with one or more specific refining agents in each case. However, these documents do not indicate how glasses having the complete requirement profile described above can be obtained in a specific manner.

It is an object of the present invention to provide glasses which meet said complex requirement profile, with respect to physical and chemical properties, which is imposed on glass substrates for liquid-crystal displays, in particular for TFT displays, and for thin-film solar cells, in particular on the basis of polycrystalline Si, glasses which have high heat resistance, a favourable processing range, high chemical resistance and in particular sufficient mechanical stability.

The object is achieved by an aluminoborosilicate glass from the composition range as defined in the independent claim.

The glass contains >58-70% by weight of $SiO_2$. At lower contents, the chemical resistance is impaired, while at higher levels, the thermal expansion becomes too low and the crystallization tendency of the glass increases. Preference is given to a maximum content of 68% by weight.

The glass contains 10-25% by weight of $Al_2O_3$. This has a positive effect on the devitrification stability of the glass and the heat resistance increases without excessively increasing the processing temperature. Preference is given to a content of 14-24% by weight of $Al_2O_3$.

The $B_2O_3$ content is 0.5-<9% by weight. The $B_2O_3$ content is restricted to the maximum content specified in order to achieve a high mechanical stability. Higher contents would also impair the chemical resistance to hydrochloric acid solutions. The minimum $B_2O_3$ content specified serves to ensure that the glass has good meltability and good devitrification stability. Preference is given to a content of 1-8.5% by weight. Particular preference is given to a maximum content of 5% by weight.

An essential glass component are the network-modifying alkaline earth metal oxides. With a sum of alkaline earth metal oxides of between >8 and 18% by weight, a coefficient of thermal expansion $\alpha_{20/300}$ of between $2.8 \times 10^{-6}$/K and $3.9 \times 10^{-6}$/K is achieved. MgO is always present, while CaO, SrO and BaO are optional components. Preferably at least two alkaline earth metal oxides are present. This second alkaline earth oxide is particularly preferably CaO. Particularly preferably at least three alkaline earth metal oxides are present.

The glass contains >8-15% by weight of MgO. These relatively high levels make it possible to obtain a glass having a modulus of elasticity which is sufficient for the increased requirements, and a low density.

The $B_2O_3$ content preferably depends on the MgO content because $B_2O_3$ and MgO have opposite effects on the modulus of elasticity. The $MgO/B_2O_3$ ratio by weight is thus preferably >1, particularly preferably >1.35.

Still higher MgO contents lead to a deterioration of the good crystallization stability and the high chemical HCl resistance of the glass.

The glass may furthermore contain up to <10%, preferably <9%, by weight of CaO. Higher levels would lead to an excessive increase in density and to an increase in crystallization tendency. It is preferred that the glass contains CaO, specifically preferably in an amount of at least 0.5% by weight, particularly preferably at least 1% by weight.

The glass may furthermore contain BaO, which has a positive effect on its devitrification stability. The maximum content is restricted to <2% by weight to keep the density of the glass low. The BaO content of the glass is particularly preferably between 0 and 0.5% by weight. When a very lightweight glass is required, the glass is most preferably free of BaO.

The glass may furthermore contain SrO. Its presence likewise has a positive effect on the devitrification stability. The maximum SrO content is restricted to <3% by weight to keep the density of the glass low. The glass contains particularly preferably between 0 and 1% by weight and most preferably between 0 and 0.5% by weight.

The sum of the two heavy alkaline earth metal oxides SrO and BaO is preferably limited to a maximum of 4% by weight.

The glass may furthermore contain up to <2% by weight of ZnO. ZnO has an effect on the viscosity characteristic line which is similar to that of boric acid, has a network-loosening function and has less effect on the thermal expansion than the alkaline earth metal oxides. The maximum ZnO level is preferably limited to 1.5% by weight, in particular when the glass is processed by the float method. Higher levels would increase the risk of unwanted ZnO coatings on the glass surface which may form by evaporation and subsequent condensation in the hot-shaping range.

The glass is alkali-free. The term "alkali-free" as used herein means that it is essentially free from alkali metal oxides, although it can contain impurities of less than 1500 ppm.

The glass may contain up to 2% by weight of $ZrO_2+TiO_2$, where both the $TiO_2$ content and the $ZrO_2$ content can each be up to 2% by weight. $ZrO_2$ advantageously increases the heat resistance of the glass. Owing to its low solubility, $ZrO_2$ does, however, increase the risk of $ZrO_2$-containing melt relicts, so-called zirconium nests, in the glass. $ZrO_2$ is therefore preferably omitted. Low $ZrO_2$ contents originating from the corrosion of zirconium-containing trough material are unproblematic. $TiO_2$ advantageously reduces the solarization tendency, i.e. the reduction in transmission in the visible wavelength region because of UV-VIS radiation. At contents of greater than 2% by weight, colour casts can occur due to complex formation with $Fe^{3+}$ ions which are present in the glass at low levels as a result of impurities of the raw materials employed.

The glass may contain conventional refining agents in the usual amounts: it may thus contain up to 1.5% by weight of $As_2O_3$, $Sb_2O_3$, $SnO_2$, $CeO_2$, $Cl^-$, $F^-$ and/or $SO_4^{2-}$. The sum of the refining agents should, however, not exceed 1.5% by weight. If the refining agents $As_2O_3$ and $Sb_2O_3$ are omitted, the glass can be processed not only using a variety of drawing methods, but also by the float method.

For example with regard to easy batch preparation, it is advantageous to be able to omit both $ZrO_2$ and $SnO_2$ and still obtain glasses having the property profile mentioned above, in particular having high heat and chemical resistance and low crystallization tendency.

WORKING EXAMPLES

Glasses were produced in Pt/Ir crucibles at 1620° C. from conventional raw materials which were essentially alkali-free apart from unavoidable impurities. The melt was refined at this temperature for one and a half hours, then transferred into inductively heated platinum crucibles and stirred at 1550° C. for 30 minutes for homogenization. The melts were poured into preheated graphite moulds and cooled down to room temperature.

The table shows eight examples of glasses according to the invention (A1-A8) and an example of a comparative glass (C) with their compositions (in % by weight, based on oxide) and their most important properties. The following properties are given:

the coefficient of thermal expansion $\alpha_{20/300}$ [$10^{-6}$/K]

the density $\rho$ [g/cm$^3$]

the dilatometric glass transition temperature $T_g$ [° C.] in accordance with DIN 52324 the temperature at a viscosity of $10^4$ dPas (referred to as T 4 [° C.])

the modulus of elasticity E [GPa]

an acid resistance "HCl" as weight loss (material removal value) from glass plates measuring 50 mm×50 mm×2 mm polished on all sides after treatment with 5% strength hydrochloric acid for 24 hours at 95° C. [mg/cm$^2$]

an alkali resistance "NaOH" as weight loss (material removal value) from glass plates measuring 50 mm×50 mm×2 mm polished on all sides after treatment with 5% strength aqueous sodium hydroxide solution for 6 hours at 95° C. [mg/cm$^2$]

a resistance "BHF" to buffered hydrofluoric acid as weight loss (material removal value) from glass plates measuring 50 mm×50 mm×2 mm polished on all sides after treatment with 10% strength $NH_4F.HF$ solution for 20 minutes at 23° C. [mg/cm$^2$].

TABLE

Examples: Compositions (in % by weight, based on oxide) and essential properties of glasses according to the invention (A1-A8) and a comparative glass (C).

| | A1 | A2 | A3 | A4 | A5 | A6 | A7 | A8 | C |
|---|---|---|---|---|---|---|---|---|---|
| $SiO_2$ | 62.1 | 61.1 | 62.1 | 61.1 | 63.0 | 65.5 | 62.0 | 65.4 | 62.2 |
| $B_2O_3$ | 4.0 | 5.0 | 3.0 | 5.0 | 6.0 | 5.0 | 6.5 | 2.5 | 6.3 |
| $Al_2O_3$ | 17.4 | 17.9 | 18.4 | 17.9 | 15.9 | 16.4 | 16.4 | 16.4 | 15.0 |
| MgO | 10.0 | 9.0 | 11.0 | 9.0 | 8.1 | 8.5 | 9.0 | 8.5 | 6.4 |
| CaO | 5.1 | 5.6 | 5.1 | 5.6 | 5.6 | 2.0 | 4.5 | 7.0 | 4.5 |
| SrO | 1.0 | — | — | 0.8 | 0.8 | 2.0 | — | — | 5.2 |
| BaO | — | 1.0 | — | 0.2 | 0.2 | 0.2 | — | — | — |
| ZnO | — | — | — | — | — | — | 0.9 | — | — |
| $As_2O_3$ | — | — | — | — | — | — | — | 0.2 | — |
| $SnO_2$ | 0.4 | 0.4 | 0.4 | 0.4 | 0.4 | 0.4 | 0.7 | — | 0.4 |
| $\alpha_{20/300}$ [$10^{-6}$/K] | 3.76 | 3.72 | 3.78 | 3.75 | 3.67 | 3.28 | 3.48 | 3.75 | 3.84 |
| $T_g$ [° C.] | 745 | 739 | 749 | 739 | 725 | 738 | 721 | 748 | 714 |
| $\rho$ [g/cm$^3$] | 2.52 | 2.513 | 2.53 | 2.510 | 2.486 | 2.468 | 2.447 | 2.502 | 2.521 |
| T 4 [° C.] | 1227 | 1225 | 1225 | 1222 | 1228 | 1266 | 1217 | 1253 | 1238 |
| E [GPa] | 88 | 87 | 91 | 87 | 85 | 85 | 85 | 88 | 80 |
| HCl [mg/cm$^2$] | 0.09 | 0.19 | 0.07 | 0.20 | 0.21 | 0.18 | 0.35 | 0.04 | n.m. |
| NaOH [mg/cm$^2$] | 1.0 | 1.1 | 1.0 | n.m. | n.m. | n.m. | n.m. | n.m. | n.m. |
| BHF [mg/cm$^2$] | 0.93 | n.m. | 0.92 | n.m. | n.m. | n.m. | n.m. | n.m. | n.m. | n.m. = not measured

As the working examples illustrate, the glasses according to the invention have the following advantageous properties:
- a thermal expansion $\alpha_{20/300}$ of between $2.8 \times 10^{-6}$/K and $3.9 \times 10^{-6}$/K, thus matched to the expansion behaviour of polycrystalline silicon.
- with $T_g > 710°$ C., a high glass transition temperature, i.e. a high heat resistance. This is essential for the lowest possible compaction as a result of production and for use of the glasses as substrates for coatings with amorphous Si layers and their subsequent annealing.
- with $\rho < 2.55$ g/cm$^3$, a low density.
- with $E > 80$ GPa, a high modulus of elasticity. This modulus or the high specific modulus of elasticity, $E/\rho$, ensures sufficient mechanical stability, in particular with regard to the sagging problem.
- a temperature at a viscosity of $10^4$ dPas (processing temperature $V_A$) of at most 1300° C., and a temperature at a viscosity of $10^2$ dPas of at most 1700° C., which means that the glasses have a suitable viscosity characteristic line with regard to hot-shaping and meltability, using conventional methods.
- a high chemical resistance, as is evident inter alia from excellent resistance to hydrochloric acid solutions, which makes them sufficiently inert to the chemicals used in the production of flat-panel screens.

With these properties, the glasses are thus highly suitable for use as substrate glass in display technology, in particular for TFT displays, and in thin-film photovoltaics, in particular on the basis of polycrystalline Si, and as substrate glass for hard disks.

The invention claimed is:

1. An alkali metal-free aluminoborosilicate glass which has a value of E>85 GPa, and the following composition (in % by weight, based on oxide):

| | |
|---|---|
| $SiO_2$ | >58-70 |
| $B_2O_3$ | 0.5-5 |
| $Al_2O_3$ | 10-25 |
| MgO | >8-15 |
| CaO | 2-<6 |
| SrO | 0-1 |
| BaO | 0-<2 |
| with MgO + CaO + SrO + BaO | >10-18 |
| ZnO | 0-<2 |
| $TiO_2$ | 0-2, and a wt. ratio of |
| MgO/$B_2O_3$ | >1.6. |

2. The aluminoborosilicate glass according to claim 1, having the following composition (in % by weight, based on oxide):

| | |
|---|---|
| $SiO_2$ | >58-68 |
| $B_2O_3$ | 0.5-5 |
| $Al_2O_3$ | 14-24 |
| MgO | >8-15 |
| CaO | 2-<6 |
| SrO | 0-1 |
| BaO | 0-<2 |
| with MgO + CaO + SrO + BaO | >10-18 |
| ZnO | 0-<2 |
| $TiO_2$ | 0-2. |

3. The aluminoborosilicate glass according to claim 1, comprising 0 to 0.5% by weight of BaO.

4. The aluminoborosilicate glass according to claim 1, comprising 0 to 0.5% by weight of SrO.

5. The aluminoborosilicate glass according to claim 1, further comprising:

| | |
|---|---|
| $ZrO_2$ | 0-2 |
| with $ZrO_2 + TiO_2$ | 0-2 |
| $As_2O_3$ | 0-1.5 |
| $Sb_2O_3$ | 0-1.5 |
| $SnO_2$ | 0-1.5 |
| $CeO_2$ | 0-1.5 |
| $Cl^-$ | 0-1.5 |
| $F^-$ | 0-1.5 |
| $SO_4^{2-}$ | 0-1.5 |
| with $As_2O_3 + Sb_2O_3 + SnO_2 + CeO_2 + Cl^- + F^- + SO_4^{2-}$ | <1.5. |

6. The aluminoborosilicate glass according to claim 1, having a coefficient of thermal expansion $\alpha_{20/300}$ of between $2.8 \cdot 10^{-6}$/K and $3.9 \cdot 10^{-6}$/K, a glass transition temperature Tg of >710° C., a density p of <2.55 g/cm$^3$ and an "acid resistance HCl" of <0.5 mg/cm$^2$.

7. In a display having a glass substrate, the improvement wherein the glass is an aluminoborosilicate glass according to claim 1.

8. In a thin-film photovoltaic having a glass substrate, the improvement wherein the glass is an aluminoborosilicate glass according to claim 1.

9. In a hard disk having a glass substrate, the improvement wherein the glass is an aluminoborosilicate glass according to claim 1.

10. The aluminoborosilicate glass according to claim 4, comprising 0% SrO.

11. The aluminoborosilicate glass according to claim 1, comprising >10-15% MgO.

12. The aluminoborosilicate glass according to claim 1, comprising 9-15% MgO.

13. The aluminoborosilicate glass according to claim 1, having a value of E 85-91 GPa.

14. The aluminoborosilicate glass according to claim 1, having a value of E >85-91 Gpa.

* * * * *

UNITED STATES PATENT AND TRADEMARK OFFICE
CERTIFICATE OF CORRECTION

| | | |
|---|---|---|
| PATENT NO. | : 7,727,916 B2 | Page 1 of 1 |
| APPLICATION NO. | : 11/713747 | |
| DATED | : June 1, 2010 | |
| INVENTOR(S) | : Peuchert et al. | |

It is certified that error appears in the above-identified patent and that said Letters Patent is hereby corrected as shown below:

On the Title Page: Item (30) reads "Mar. 24, 2001 (DE) 101 14 581" should read -- August 5, 1999 (DE) 101 14 581 --.

Signed and Sealed this

Twenty-fourth Day of August, 2010

David J. Kappos
*Director of the United States Patent and Trademark Office*